(12) United States Patent
Svensson et al.

(10) Patent No.: US 11,072,255 B2
(45) Date of Patent: Jul. 27, 2021

(54) ROBOTIC WORK TOOL SYSTEM AND A CHARGING CONNECTOR ARRANGEMENT FOR A ROBOTIC WORK TOOL SYSTEM

(71) Applicant: HUSQVARNA AB, Huskvarna (SE)

(72) Inventors: Mats Svensson, Huskvarna (SE); Patrik Jägenstedt, Tenhult (SE); Magnus Öhrlund, Malmbäck (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/689,570

(22) Filed: Nov. 20, 2019

(65) Prior Publication Data

US 2020/0156484 A1 May 21, 2020

Related U.S. Application Data

(63) Continuation of application No. 15/111,253, filed as application No. PCT/SE2014/050044 on Jan. 16, 2014, now Pat. No. 10,518,651.

(51) Int. Cl.
*B60L 53/30* (2019.01)
*B60L 1/00* (2006.01)
(Continued)

(52) U.S. Cl.
CPC ............ *B60L 53/30* (2019.02); *A01D 34/008* (2013.01); *B60L 1/003* (2013.01); *B60L 11/1824* (2013.01);
(Continued)

(58) Field of Classification Search
CPC ..... Y02T 90/14; Y02T 90/128; Y02T 90/163; Y02T 10/7005; Y02T 10/7088;
(Continued)

(56) References Cited

U.S. PATENT DOCUMENTS

| | | | |
|---|---|---|---|
| 4,158,802 A | * | 6/1979 | Rose, II .................. H02J 7/02 320/109 |
| 6,525,509 B1 | | 2/2003 | Petersson et al. |

(Continued)

FOREIGN PATENT DOCUMENTS

| | | |
|---|---|---|
| DE | 3918867 A1 | 10/1989 |
| EP | 2679084 B1 | 5/2014 |

(Continued)

OTHER PUBLICATIONS

Husqvarna, "Husqvarna Automower 230 ACX", accessed at http://www.husqvarna.com/us/products/robotic-mowers/automower-230-acx/, accessed on Feb. 16, 2018.

(Continued)

*Primary Examiner* — Nathaniel R Pelton
*Assistant Examiner* — Mohammed J Sharief
(74) *Attorney, Agent, or Firm* — Burr & Forman, LLP

(57) ABSTRACT

A robotic work tool system, comprising a charging station and a robotic work tool, said robotic work tool comprising two charging connectors arranged on an upper side of the robotic work tool and said charging station comprising two charging connectors and a supporting structure arranged to carry said charging connectors and to extend over and above said robotic work tool as the robotic work tool enters the charging station for establishing electrical contact between the charging connectors of the robotic work tool and the charging connectors of the charging station from above, wherein said supporting structure is arranged to allow the robotic work tool exit the charging station by driving through the charging station without reversing.

13 Claims, 4 Drawing Sheets

(51) Int. Cl.
| | |
|---|---|
| *B60L 15/20* | (2006.01) |
| *A01D 34/00* | (2006.01) |
| *B60L 50/52* | (2019.01) |
| *B60L 53/16* | (2019.01) |
| *B60L 50/16* | (2019.01) |
| *B60L 11/18* | (2006.01) |
| *H02J 7/00* | (2006.01) |

(52) U.S. Cl.
CPC .......... *B60L 15/2036* (2013.01); *B60L 50/16* (2019.02); *B60L 50/52* (2019.02); *B60L 53/16* (2019.02); *H02J 7/0027* (2013.01); *H02J 7/0045* (2013.01); *B60L 2200/40* (2013.01); *B60L 2220/46* (2013.01); *B60L 2240/62* (2013.01); *B60L 2240/667* (2013.01); *B60L 2260/32* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
CPC . Y02T 10/7077; Y02T 10/7275; Y02T 10/70; Y02T 10/645; Y02T 90/16; Y02T 10/7291; Y02T 90/162; Y02T 10/72; Y02T 10/7072; Y02T 90/121; B60L 11/1824; B60L 50/52; B60L 53/16; B60L 53/30; B60L 50/16; B60L 1/003; B60L 15/2036; B60L 2200/40; B60L 2220/46; B60L 2240/62; B60L 2240/667; B60L 2260/32; B60L 53/00; B60L 53/50; B60L 53/53; B60L 53/55; B60L 53/57; H02J 7/0027; H02J 7/0045; A01D 34/008
USPC .................................................. 320/104, 109
See application file for complete search history.

(56) References Cited

U.S. PATENT DOCUMENTS

| | | | |
|---|---|---|---|
| 6,586,908 | B2 | 7/2003 | Petersson et al. |
| 7,332,890 | B2 | 2/2008 | Cohen et al. |
| 2005/0010330 | A1 | 1/2005 | Abramson et al. |
| 2005/0029025 | A1 | 2/2005 | Medina |
| 2005/0046387 | A1* | 3/2005 | Aker ............... H02J 7/0071 320/125 |
| 2006/0010844 | A1 | 1/2006 | Angott |
| 2009/0183478 | A1* | 7/2009 | Bernini ............. A01D 34/008 56/10.2 A |
| 2009/0315501 | A1 | 12/2009 | Li et al. |
| 2010/0174434 | A1 | 7/2010 | Sip |
| 2011/0130875 | A1 | 6/2011 | Abramson |
| 2011/0234153 | A1 | 9/2011 | Abramson |
| 2012/0074891 | A1 | 3/2012 | Anderson et al. |
| 2013/0006418 | A1 | 1/2013 | Tian et al. |
| 2013/0193918 | A1* | 8/2013 | Sarkar ................ B60L 53/51 320/109 |
| 2014/0070767 | A1* | 3/2014 | Morris ............... B60L 53/30 320/109 |
| 2014/0152255 | A1 | 6/2014 | Lovett et al. |
| 2016/0130851 | A1 | 5/2016 | Storm |
| 2016/0167530 | A1* | 6/2016 | Bolik ................ B60L 53/305 320/108 |

FOREIGN PATENT DOCUMENTS

| | | |
|---|---|---|
| WO | 2010060720 A2 | 6/2010 |
| WO | 2011079215 A2 | 6/2011 |
| WO | 2013055204 A1 | 4/2013 |
| WO | 2013100833 A1 | 7/2013 |

OTHER PUBLICATIONS

Lawnbotts, "LawnBott LB3510 Lawn Mower", accessed at http://www.lawnbotts.com/lawnbott/LawnBott_LB3500_Robotic_Lawn_Mower_html , accessed on Feb. 16, 2018.
Robomow, "Robomow RL2000", accessed at http://www.robomow.com/en-USA/products-usa/medium-gardens/I-2000, accessed on Feb. 16, 2018.
International Search Report and Written Opinion in International Application No. PCT/SE2014/050044 dated Oct. 28, 2014.
International Preliminary Report on Patentability in International Application No. PCT/SE2014/050044 dated Jul. 19, 2016.
The Daily Telegraph (London), Edition 1, National Edition, Section: Gardening Features, by Jean Vernon, dated Mar. 30, 2013.
ROBOLINHO 3000 Robot Lawnmower Operating Instructions, copyrighted 2012.
Blog posted in Robotic Lawn Mowers entitled, "AL-KO Robot Mower Voted Best for Medium Gardens by the Daily Telegraph", by thegreenreaper, Apr. 10, 2013 (http://www.thegreenreaper.co.uk/al-ko/al-ko-lawn-mowers/al-ko-robotic-lawn-mower/al-ko-robolinho-3000-robotic-lawn-mower) (Accessed Jan. 27, 2021).

* cited by examiner

ROBOTIC WORK TOOL SYSTEM AND A CHARGING CONNECTOR ARRANGEMENT FOR A ROBOTIC WORK TOOL SYSTEM

CROSS-REFERENCE TO RELATED APPLICATIONS

This application is a continuation of U.S. patent application Ser. No. 15/111,253 filed Jul. 13, 2016, which is a national stage entry of International Application No. PCT/SE2014/050044 filed Jan. 16, 2014; each of U.S. patent application Ser. No. 15/111,253, and International Application No. PCT/SE2014/050044 are incorporated herein by reference in their entirety.

TECHNICAL FIELD

This application relates to a robotic work tool system for improved charging, and in particular to a robotic work tool system for improved charging while ensuring a safe operation and for minimizing the wear and tear of a work area in which the robotic work tool is to operate within.

BACKGROUND

Many contemporary robotic working tools, such as robotic lawnmowers, are designed to work in a work area defined by a boundary, for example through the use of a boundary wire. Electrical robotic work tools operate inside the working area and are driven by battery power. To recharge the batteries of the robotic work tool a charging station is used that the robotic work tool enters when the battery power drops below a certain level or when an operating program, such as a mowing program, is finished. Alternatively, the robotic work tool is propelled using a combustion engine, in such an alternative, the robotic work tool is configured to enter a service station for example for taking on additional fuel.

Traditionally, robotic work tools are of a relatively small size so that they are suitable for operating in a private sphere such as in a home or an office for robotic work tools such as vacuum cleaners or a garden for lawnmower robots. The charging stations for such traditional robotic work tools are of a drive-in model where the robotic work tool enters the charging station from the front, makes contact with charging contacts or other power transferring means, and, when fully charged, reverses out of the charging station to continue operation.

As technology evolves more and more advanced uses are becoming available for robotic work tools. Examples of such more advanced uses are lawnmowers with a greater capability for mowing larger areas and farming equipment which are being made possible by evolved battery and electrical motor technology. These robotic work tools are of a larger size and also often prone to more wear and tear and rougher operating conditions. In one instance the rougher operating conditions are a result of the operating area being larger and the operating excursion of a longer duration under which the robotic work tool is subjected to more dirt and other environmental factors, wind, blowing debris et.c.

Traditional servicing stations (such as charging stations or fuelling stations) are not suitable for such evolved robotic work tools in that the construction of the charging station becomes too heavy. Traditional servicing stations also block the travel path of a robotic work tool that may be unable to reverse. The traditional charging stations are thus limiting with regards to for example placement.

Furthermore, traditional service stations also suffer from lawn wear being caused in the area surrounding the service station by the robotic work tool as it attempts to align with and dock with the service station.

Traditional service stations also require more time and effort to be aligned with.

There is thus a need for a robotic work tool system adapted for more complicated robotic work tools

SUMMARY

It is an object of the teachings of this application to overcome the problems listed above by providing a robotic work tool system, comprising a charging station and a robotic work tool, said robotic work tool comprising two charging connectors arranged on an upper side of the robotic work tool and said charging station comprising two charging connectors and a supporting structure arranged to carry said charging connectors and to extend over said robotic work tool as the robotic work tool enters the charging station for establishing electrical contact between the charging connectors of the robotic work tool and the charging connectors of the charging station from above, wherein said supporting structure is arranged to allow the robotic work tool exit the charging station by driving through the charging station without reversing.

This enables the charging station to be used with two-part models, such as articulated models, as well as one-part models and it also reduces the tracks and lawn-wear in the area surrounding the charging station. It also reduces the size necessary for the charging station as the charging connectors only need to be carried on a small supporting structure extending over the robotic work tool. As the robotic work tool is supposed to drive through the charging station, the supporting structure may not block the travel path of the robotic work tool.

In on embodiment the charging connectors of the robotic work tool are arranged in series. This further reduces the size necessary for the supporting structure, making the charging station even smaller.

In on embodiment the charging connectors of the robotic work tool are arranged on one side of the upper side of the robotic work tool with regards to the direction of movement of the robotic work tool. This further decreases the necessary size of the supporting structure.

A smaller structure is also easier to make in a strong and robust manner with out affecting the weight so that the arrangement would be difficult to transport or install.

The extending structure also enables for an easy addition of a roof or other superstructure. The extending structure coupled with a cover or roof thereby enables the charging station to protect components that are sensitive to wear and tear and other influences from the environment.

In one embodiment the charging connector of the charging station is arranged as a collector shoe gear. This enables the charging connectors to clean each other by scraping of dirt. It also allows for variance in the height of the robotic work tool to be charged.

Further benefits of the teachings herein include, but are not limited to, that the charging connector arrangement is arranged to provide a constant contact pressure independent of the height, tilt and sideways position of the robotic wok tool and the service station is able to receive a robotic work tool in either direction. The charging station according to herein is thus arranged to accept and cope with variances in sideways position and sideways tilting of a robotic work tool to be serviced.

The robotic work tool and the charging station according to the teachings herein is thus suitable for operation in dirty and rough environments and will be able to function even after being subjected to wear and tear such as being covered in dirt and/or slightly rusted, situations in which rolling wheel contacts may not be able to function correctly.

In one embodiment the robotic work tool is a robotic lawnmower. In one embodiment the robotic work tool 100 is a farming equipment. In one embodiment the robotic work tool 100 is a golf ball collecting tool. The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The inventors of the present invention have realized, after inventive and insightful reasoning that by providing for a drive-through arrangement the supporting structure may be made sufficiently small to be easy to transport.

Furthermore, the use of connector rails and sliding contacts provide for an easy to maintain system which is robust and also accommodates for variance in heights of robotic work tools to be charged.

It is an object of the teachings of this application to overcome the problems listed above by providing a charging connector arrangement for a robotic work tool system comprising a robotic work tool and a charging station, said charging connector arrangement comprising a rail connector arranged on said robotic work tool and a mating charging connector arranged on said charging station, said mating charging connector being movably connected to said charging station through a lever arrangement to enable a reduced friction and reducing an impact when said robotic work tool enters said charging station and said mating charging connector makes contact with said connector rail.

It is an object of the teachings of this application to overcome the problems listed above by providing a service station is provided, said service station robotic work tool system, comprising a service station and a robotic work tool, said robotic work tool comprising at least one corresponding connector arranged on an upper side of the robotic work tool and said service station comprising at least one mating connector and a supporting structure arranged to carry said at least one mating connector and to extend over said robotic work tool as the robotic work tool enters the service station for establishing an energy transfer contact between the at least one corresponding connector of the robotic work tool and the at least one mating connector of the service station from above, wherein said supporting structure is arranged to allow the robotic work tool to exit the service station by driving through the charging station.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
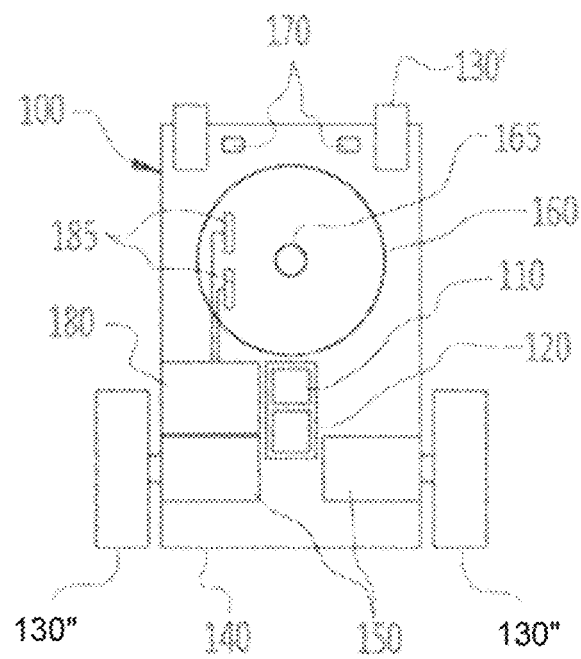
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further has at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a robotic lawnmower.

The robotic tool may be powered by an electric motor 150 or a combustion engine 150, or a combination of the two. Below will be given a short description of both such systems.

In the event that the robotic work tool is powered by a combustion engine 150, the robotic work tool 100 also has a fuel tank 180 for providing fuel to the combustion engine 150 driving the wheels and possibly the cutter 160. Alternatively, the fuel tank 180 also provides fuel to a cutter engine 165. Connected to the fuel tank 180 is a fuel intake adapted to establish a servicing connection with a corresponding mating connector (referenced 230 in FIG. 2) on a service station (referenced 210 in FIG. 2) for receiving fuel from service station (referenced 210 in FIG. 2). In the event that the robotic work tool is powered by an electric motor 150, the robotic work tool 100 also has (at least) one battery 180 for providing power to the motors 150 and the cutter motor 165. Connected to the battery 180 is two charging connectors, such as charging plates or charging rails 185 adapted to establish an electrical connection with a corresponding mating charging connector (referenced 230 in FIG. 2) on a charging station (referenced 210 in FIG. 2) for receiving a charging current from a charger (referenced 220 in FIG. 2) of the charging station (referenced 210 in FIG. 2). In one embodiment the charging connectors 185 are adapted to establish the electrical contact by establishing physical contact which is maintained through a biased member, such as by a spring or an inherent resilience of a flexible material being used as the charging connectors (230) of the charging station (210).

The charging connectors 185 are arranged on an upper portion of the robotic work tool 100 so that they are accessible from above. In one embodiment the charging connectors 185 are arranged on the upside of the robotic work tool 100. The charging connectors 185 are furthermore arranged on one side of the robotic work tool 100 which enables a supporting member arranged to carry corresponding charging connectors (such as a support structure referenced 270 in FIG. 2) to only extend over a portion of a side of the robotic work tool 100. In this context the one side of the robotic work tool 100 is in relation to an imaginary halfway line across the width of the robotic work tool 100 seen in a direction of movement of the robotic work tool 100, i.e. a left side or a right side. The charging connectors 185 are arranged on one side of the robotic work tool with respect to an imaginary halfway line going through the robotic work tool parallel to a direction of movement of the robotic work tool 100.

Figure 2:
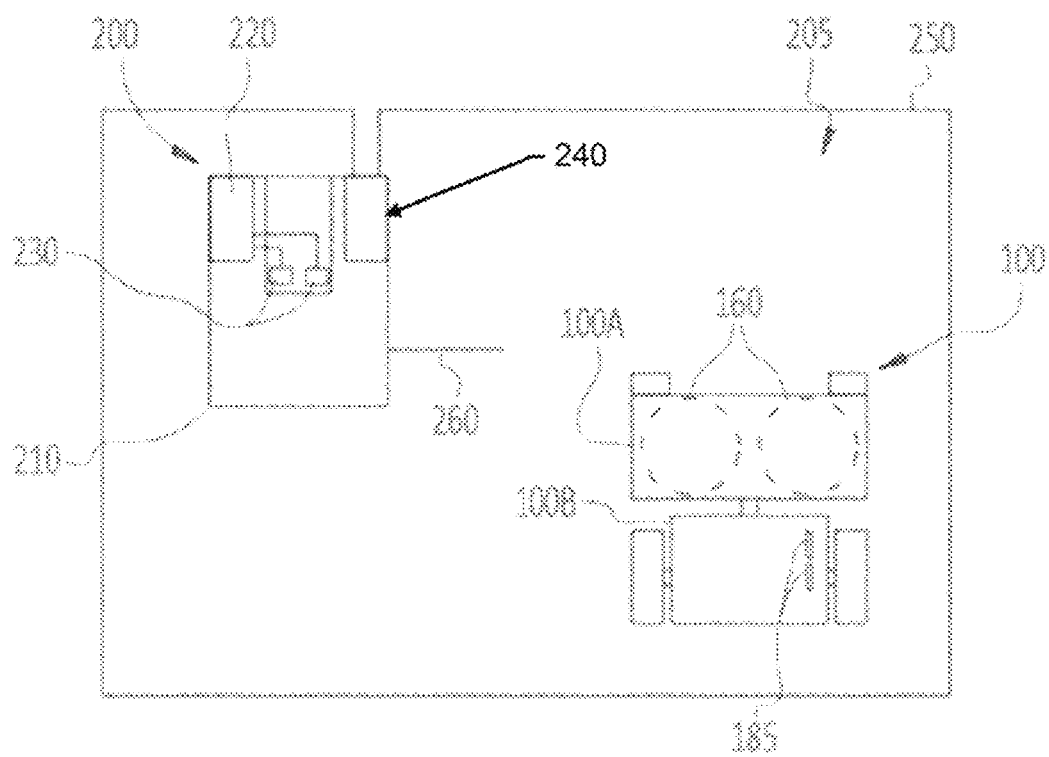
FIG. 2 shows a schematic view of a robotic working tool system according to one embodiment of the teachings of this application.

In one embodiment the robotic work tool 100 is of an articulated two-part model as is shown in FIG. 2. It should be noted however, that the teachings herein are also possible for one-part models and other two part models.

FIG. 2 shows a schematic view of a robotic working tool system 200 comprising a charging station 210 and a boundary wire 250 arranged to enclose a working area 205, the working area 205 not necessarily being a part of the robot system 200.

The robotic work tool 100 of FIG. 2 is of a two-part model having a first operating part 100A comprising operating means 160. In the example of FIG. 2, the robotic work tool 100 being a robotic lawnmower, the operating part 100A comprises two cutting blades 160. It should be noted that, in one embodiment, the operating part 100A may be interchangeable. This allows for using the same robotic work tool 100 for different operations. The robotic work tool 100 also has a second driving part 100B, which, in the example of FIG. 2, comprises the driving means (electrical motor) and batteries (not shown). In the example of FIG. 2, the charging connectors 185 are arranged on the second part 100B of the robotic work tool 100 so that they are easily connected to the batteries (not shown).

The charging station 210 has a charger 220 coupled to, in this embodiment, two mating charging connectors 230. The mating charging connectors 230 are arranged to co-operate with corresponding charging connectors 185 of the robotic work tool 100 for charging the battery 180 of the robotic work tool 100. The mating charging connectors 230 of the charging station are arranged on a support structure 270 which is arranged to rise above the robotic work tool 100 as the robotic work tool 100 docks in the charging station. In this manner the mating charging connectors 230 of the charging station 210 may establish electrical contact with the corresponding charging connectors 185 of the robotic work tool 100 from above.

By establishing the connection from above many advantages are provided for, one being enabling a drive-through charging (or servicing) system for the robotic work tool 100 as there is no longer a wall or other structure in front of the robotic work tool 100 holding the charging connectors as in many prior art systems where a robotic work tool 100 drives up to a charging station and presses against it using motor force. The clever charging connector arrangement 230 disclosed herein enables a secure connection without having to exert such driving pressure.

By using a drive-through charging station the lawn will be cut more evenly around the charging station 210 avoiding aesthetically unpleasing patterns in the lawn. Using a drive-through servicing station, especially one that a robotic work tool can enter from either direction, enables the robotic work tool to more easily find the charging station and enter it without repeated and excessive operation (such as grass cutting) in one and the same area (such as the entrance to the charging station).

Furthermore, by establishing the connection from above the protection for the connectors is provided for by the support structure carrying the connectors. The support structure can be designed to provide shelter against rain or other environmental factors, for example by simple providing the structure with a roof or other cover. Also, as the charging connectors are placed at an upper side, they will be less subjected to debris, dirt and waste products (such as cut grass).

Furthermore, drive-in charging systems, such as in the prior art, generally require comparatively large structures in order to provide protective shelter for the charging connectors, which becomes a problem, especially for larger robotic work tools as the protective shelter will increase in size according to the size of the robotic work tool, making the resulting large charging station difficult to transport and to install as has been discussed in the background section. This will be discussed in greater detail in the embodiments below.

To enable a reduced size of the charging station, the charging connectors 185 of the robotic work tool and the corresponding mating charging connectors 230 of the charging station 210 are arranged in series—and not in parallel—with reference to a movement direction of a robotic work tool entering the charging station. This allows for a charging station to be made smaller as the support structure 270 of the charging station (making up the protective cover for the charging contacts) only need to extend over the two charging contacts. By arranging the mating charging connectors 230 in series and by enabling a drive-through operation, the support structure 270 may only need to extend partially over one side of the robotic work tool 100 (when docked). This significantly reduces the size of the charging station which enables the charging station 210, and especially the support structure 270, to be made in a robust design suitable for outdoor use, without making the charging station 210 unsuitable for easy transport.

Drive-in charging systems are also unsuitable for use with some robotic work tools, for example an articulated two-part model not having advanced steering capabilities, as they may be unable to reverse out of the charging station, depending on the design and allocation of the driving means of the robotic work tool. This will also be discussed in greater detail in the embodiments below The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robot to follow the boundary wire 250, for example when returning to the charging station 210 for charging.

Traditionally, the charging station 210 may also have a guide cable 260 for enabling the robot to find the entrance of the charging station 210. In one embodiment the guide cable 260 is formed by a loop of the boundary wire 250. The use of a drive-through servicing station makes it possible for the robotic work tool to find its way to the servicing station without a guide cable, y simply arranging the charging station in line with the boundary cable.

It should be noted that other means of creating a boundary of the work area and means for detecting such a boundary, as well as other means of finding and navigating to and into the service station are possible and should be seen as to be covered in this application. The means disclosed above are but one example of how such a robotic work tool may be implemented.

Figure 3:
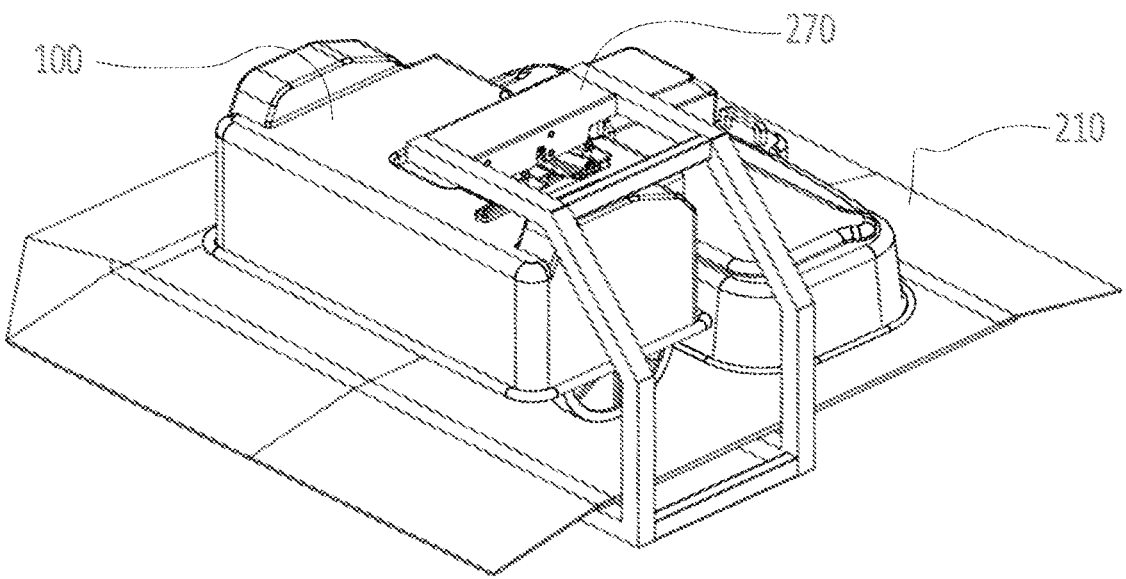
FIG. 3 shows a schematic view of a robotic work tool system according to one embodiment of the teachings of this application.

FIG. 3 shows a schematic view of a robotic work tool system, such as the robotic work tool system 200 of FIG. 2. A robotic work tool 100 is docked in a charging station 210. The docking station 210 has a support structure extending (at least) partially over the robotic work tool 100. The support structure 270 is arranged to carry two mating charging connectors (not shown in FIG. 3, but shown in detail in FIGS. 4 and 5) for cooperation with corresponding charging connectors on the robotic work tool (not shown in FIG. 3, but shown in detail in FIGS. 4 and 5).

As can be seen in FIG. 3, the drive-through concept for the charging station 210 enables for a small, yet sturdy design, especially for the support structure 270 carrying the mating charging connectors. By arranging the corresponding charging connectors on one side of an upper side of the robotic work tool, and possibly also in series, the support structure need only be of a relatively small size irrespective of in which part (referenced 100A and 100B in FIG. 2) of the robotic work tool 100 that the corresponding charging connectors are arranged.

For example, using a traditional drive-in charging station, a support member carrying the charging connectors would need to reach across substantially the entire length of the robotic work tool 100 to reach charging connectors arranged on the rear part of the robotic work tool 100. Alternatively, charging connectors may need to be placed in the operating part (100A) of the robotic work tool 100 in order to enable charging in a drive-in charging station as in the prior art. However, this would make the operating part (100A) difficult to interchange as the charging connectors would require disconnecting and reconnecting. Furthermore, one prior art charging station solution of having a charging connector on a side of the robotic work tool is especially prone to wear and tear in that the charging connector has to extend at a level where it is subjected to debris and waste and is also sensitive to sideways collision damage. These problems and others are solved by a robotic work tool system 200 as in FIGS. 3 and 4.

The support structure 270 is arranged to provide protective cover for the parts that are sensitive and/or vulnerable, such as the charging connectors (referenced 230 in FIG. 2), to protect from rain and other environmental factors, by extending around the charging connectors. As only the charging connectors need be protected, the support structure 270 need not be made larger than to extend around the charging connectors, and if they are placed on one side of the robotic work tool 100, the support structure can be made comparatively small.

As has been mentioned in the above, the comparatively small size of the support structure 270 enables for maintaining a low weight, while still allowing the support structure to be sturdy and robust to protect against external force. For example, the support structure 270 may be designed to be able to support the weight of a sitting person enabling a care taker to use the charging station as a resting place without risking damaging the charging station 210.

Figure 4:
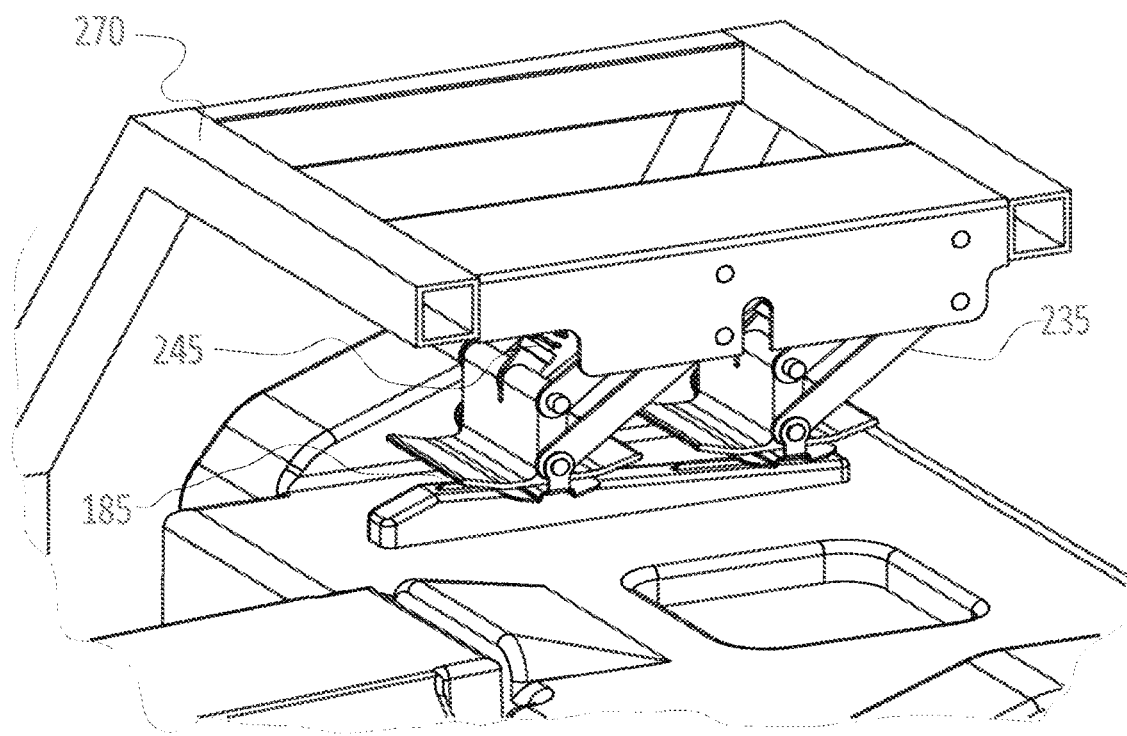
FIG. 4 shows an enlarged sectional schematic view of a robotic work tool system according to one embodiment of the teachings of this application.

FIG. 4 shows an enlarged sectional schematic view of a robotic work tool system 200, as in FIG. 3. The charging connectors 185 of the robotic work tool 100 are arranged in series, with relation to a direction of movement of the robotic work tool 100. Corresponding mating charging connectors 230 of the charging station 210 are arranged to extend from the support structure 270 through each a lever arrangement 235. In the example embodiment of FIG. 4, the lever arrangement 235 is arranged to move in a direction substantially parallel to the direction of the robotic work tool's 100 movement as well as in a movement up and down.

The movement in the direction of the robotic work tool's 100 movement allows for the up/down movement to be smooth and with as little friction as possible as the charging connectors 185 of the robotic work tool 100 simply lifts the lever arrangement 235 to a suitable height by moving the mating charging connector 230 forwards which simultaneously moves the mating charging connector 230 upwards.

The movement up and down allows for variations in height of the robotic work tool 100 to be charged. The movement up/down also allows for establishing a proper contact between the corresponding charging connectors 185 and the mating charging connectors 230. It also enables for providing a substantially constant contact pressure, regardless of the height of the robotic work tool, and the arrangement is thus suitable for use with different models.

In one embodiment the mating charging connectors 230 of the charging station 210 are implemented as a collector shoe gear arrangement.

In one embodiment the lever arrangements 235 are biased downwards by their own weight to ensure a proper contact is established between the corresponding charging connectors.

In one embodiment, as in the example of FIG. 4, the lever arrangements 235 are spring-biased, for example through a spring 245, to ensure that an improved contact is established between the charging contacts 185 of the robotic work tool 100 and the charging contacts 230 of the charging station 210.

By applying a biasing force to the lever arrangement 235, the connectors 230 and 185 are brought into better contact with each other. Furthermore, by being pressed against each other the connectors 230 and 185 clean each other's surfaces upon contact by scraping against each other, thereby removing cut grass, leaves and other debris commonly found in a garden that may have clung to either of the mating charging connectors 230 or 185. This is also beneficial for preventing erosion on either of the connectors 185 and 230.

Figure 5:
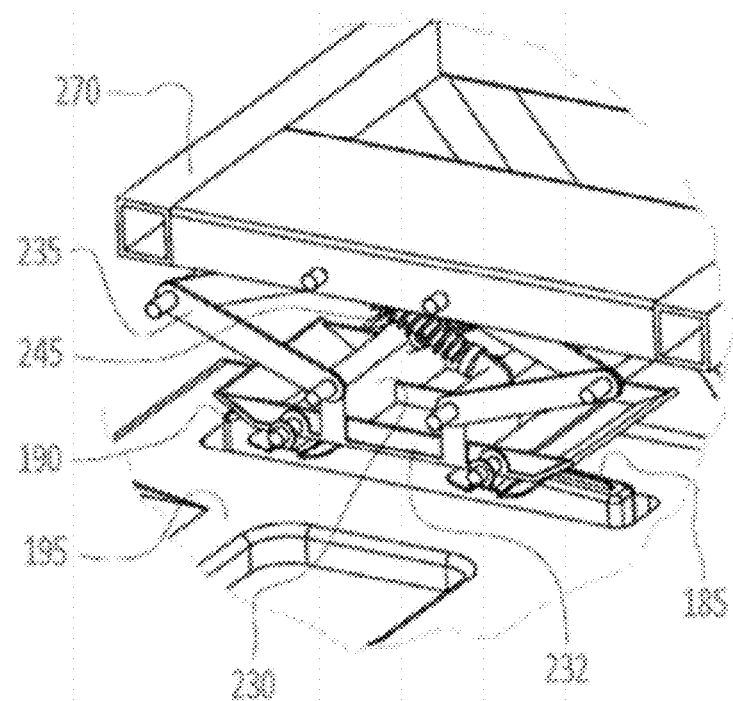
FIG. 5 shows an enlarged sectional schematic view of an alternative robotic work tool system according to one embodiment of the teachings of this application.

FIG. 5 shows an alternative embodiment of a charging station 210, wherein the lever arrangement 235 is of a scissor-like construction. The construction may be implemented as a (inverted) pantograph. This allows for accepting a robotic work tool 100 to be charged from either direction. The lever arrangement 235 of FIG. 4 is best used to allow a robotic work tool 100 to enter from one side, whereas the lever arrangement 235 of FIG. 5 allows a robotic work tool 100 to enter from either direction. The lever arrangement 235 of FIG. 5 also folds away nicely in case of a collision. The lever arrangement of FIG. 4 may also be used in a system that allows for entry in either direction, but the dimensions of the lever arrangement must be better adapted to the height of the robotic work tool so that no unnecessary collision forces are exerted upon contact.

As can be seen in FIG. 5, the mating charging connector 230 may comprise on insulating member 232 carrying two sliding contacts (231). Alternatively, the mating charging connector may be comprised of two separate charging connectors, as in FIGS. 4 and 6.

Figure 6:
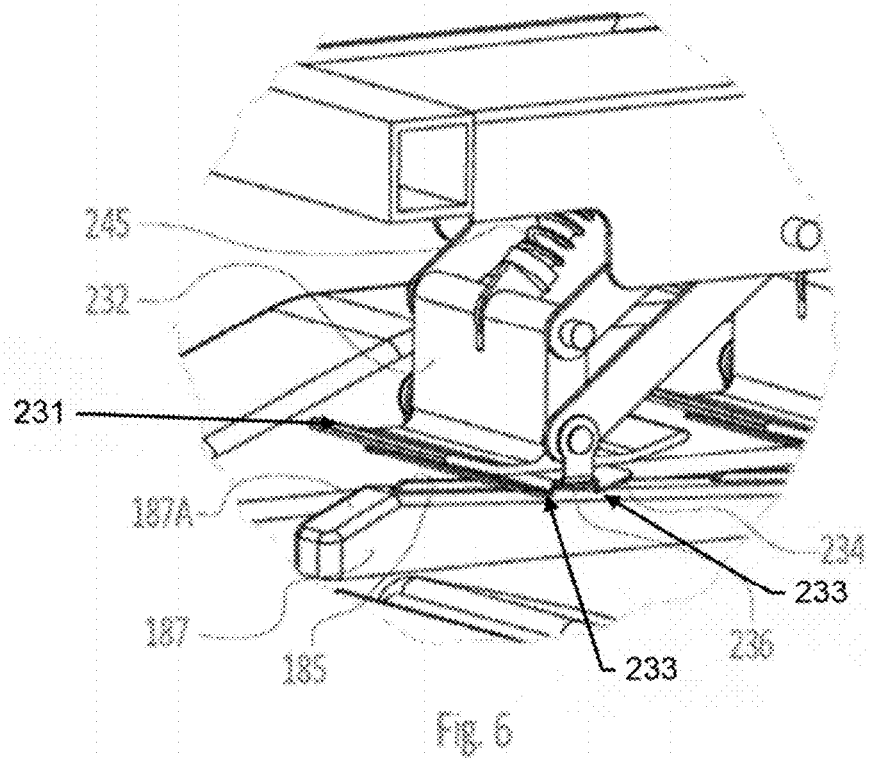
FIG. 6 shows a detailed view of a robotic work tool system according to one embodiment of the teachings of this application.

FIG. 6 shows a detailed view of a robotic work tool system 200 as in FIGS. 2, 3, 4 and 5 emphasizing on the charging connectors 185 of the robotic work tool 100 and the corresponding mating charging connectors 230 of the charging station 210.

Even though FIG. 6, shows a lever arrangement as in FIGS. 3 and 4, it should be noted that the same type of connectors 230 may be used with a lever arrangement 235 as in FIG. 5.

In the embodiment of FIG. 6, the mating charging connector 230 of the charging station comprises a sliding contact 235. In one embodiment the sliding contact comprises a collector shoe gear. And, the charging contact 185 of the robotic work tool 100 is a connector rail 185.

In one embodiment the collector shoe gear is substantially wider than the connector rail 185. This allows for discrepancy and variance in the position of the robotic work tool 100 with respect to the charging station 210 and also placement of the connector rail(s) 185 on the robotic work tool 100. The charging station may thus be used with different types of robotic work tools 100 and also allow for smaller errors in navigation.

In the example of FIG. 6, the connector rail(s) 185 are arranged on a rail support 187 having a front slanting portion 187A. The front slanting portion 187A enables a smoother directed entry into the charging station 210 as also the rail support 187 assists with raising a collector shoe gear, should the collector shoe gear be at a level lower than the connector rail(s) 185 as the robotic work tool 100 enters the charging station 210.

This also allows for slight deviations in robotic work tool entry angles and robotic work tool heights. It also protects the sliding contacts and the hull of the robotic work tool 100 from collision damage.

In one embodiment the rail support 187 is also arranged to have slanting sides 187B. This enables electrical contact to be established even if the robotic work tool is entering the charging station at a leaning angle.

In one embodiment the driving part 100B of the robotic work tool 100 comprises a chassis (not explicitly shown) and a hull 195 covering the chassis and the connector rail 187 is arranged on the chassis of the robotic work tool 100 to protrude through a corresponding opening in the hull. The opening in the hull is clearly visible in FIG. 5 and referenced 190. This allows for an easier assembly, disassembly and reassembly of the robot as no connector wires are needed between the upper hull and the covered chassis. The hull 190 can thus simply be removed and replaced without the need for disconnecting and reconnecting any wires.

The collector shoe gear arrangement for the connector 230 comprises a sliding shoe contact 231 which is arranged to establish contact with the corresponding charging connector rail 185 of the robotic work tool 100. The sliding shoe contact 231 is arranged to be carried on an insulating member 232 insulating the sliding shoe contact 231 from the lever arrangement 235.

The sliding shoe contact is arranged to be angled on the face 232 meeting the connector rail 185 as the robotic work tool 100 enters the charging station 210. Furthermore, the sliding shoe may be movably arranged to the insulating member 232 (or, alternatively, the insulating member 232 is movably arranged on the lever arrangement) to allow movement of the sliding shoe contact upon contact with the connector rail 185. This reduces the friction and impact between the charging rail 185 and the sliding shoe contact 231 as the robotic work tool 100 enters the charging station 210. This arrangement also protects the connectors 185 and 230 from collision damage.

In one embodiment (as shown in the figures) the insulating member 232 is arranged with corresponding angled portions.

In one embodiment, as in FIG. 6, the sliding contact 231 is also angled on the face leaving the charging rail 185 as the robotic work tool 100 exits the charging station 210. This reduces the wear and tear between the charging connectors 185 and 230. This also allows for multiple direction entry as in the embodiment of FIG. 5.

In one embodiment the sliding contact 231 is arranged with a partition which effectively shapes the sliding contact 231 into at least two contact surfaces 233. In one embodiment, as in FIG. 6, the contact surfaces are shaped to be pointed. The use of multiple contact points reduces eroding and also reduces the risk of electrical discharge. The pointed shape reduces the contact surface of the sliding contact 231 which increases the pressure in the contact point 233 which improves the electrical connection between the connectors.

The sliding contact 231 is thus formed to have at least one wing 234 and at least two contact points 233 separated by a partition 236. Due to the angling of the wings 234 abutting the contact points 233 the contact points 233 are arranged to be pointed and have a small contact surface.

The arrangement of multiple contact points and that are shaped to increase the contact pressure in the contact points enable for high charging currents to be used (around 10 A, and above 2 A) and the charging station can thus be used for larger and possibly more complicated robotic work tools 100 that the charging stations of the prior art would not be able to provide a sufficient charging current to.

Furthermore, in one embodiment with two connector rails 185, the connector rails 185 are arranged spaced apart on the same rail support 187. Arranged in between the two connector rails 185 may be an insulating material. The connector rails 185 should be spaced apart a distance wider than the length of a corresponding collector shoe partition 236 to ensure that the charging system is not short circuited. In one embodiment the collector shoe partition 236 has a width of 18 mm and the connector rails are spaced apart 26 mm. In one embodiment the connector rails 185 are each 94.5 mm long and the collector shoes are spaced apart 120 mm.

In one embodiment the sliding contact 231 is rotatably connected to the collector shoe arrangement (as has been disclosed in the above). This enables for the sliding contact 231 to move and adapt to a connector rail 185 that hits the collector shoe gear at an angle other than a preferred angle. This reduces the wear and tear on the collector shoe arrangement and prolongs the effective life time of the charging contacts.

Suitable dimensions of the rails 185, the rail support 187, the lever system holding the charging connectors 230 and the charging connectors 230 depend on many design variables, such as the docking speed of the robotic work tool 100, the charging current and the accuracy of the positioning of the robotic work tool 100. It also depends on the exact model of the robotic work tool to be charged. Above has been given some examples of dimensions, but it should be understood that the dimensions may vary between different systems.

Rolling wheels would for example be more prone to eroding and electrical discharge. Especially the rolling wheels would be more sensitive to wear and tear especially in the wheel bearings. Also, they would be sensitive to debris and waste and a wheel partially covered in waste may not be able to establish an electrical connection if the covered portion of the wheel is in contact with a corresponding connector. The same applies to charging connectors which are pressed against each other simply by the weight of the robotic work tool standing parked in the charging station. Furthermore a system in which the robotic work tool 100 continues to press against the mating charging connectors 230 of the charging station is also prone to eroding and electrical discharge caused by the repeated minute collisions that arise in such a system.

Figure 7:
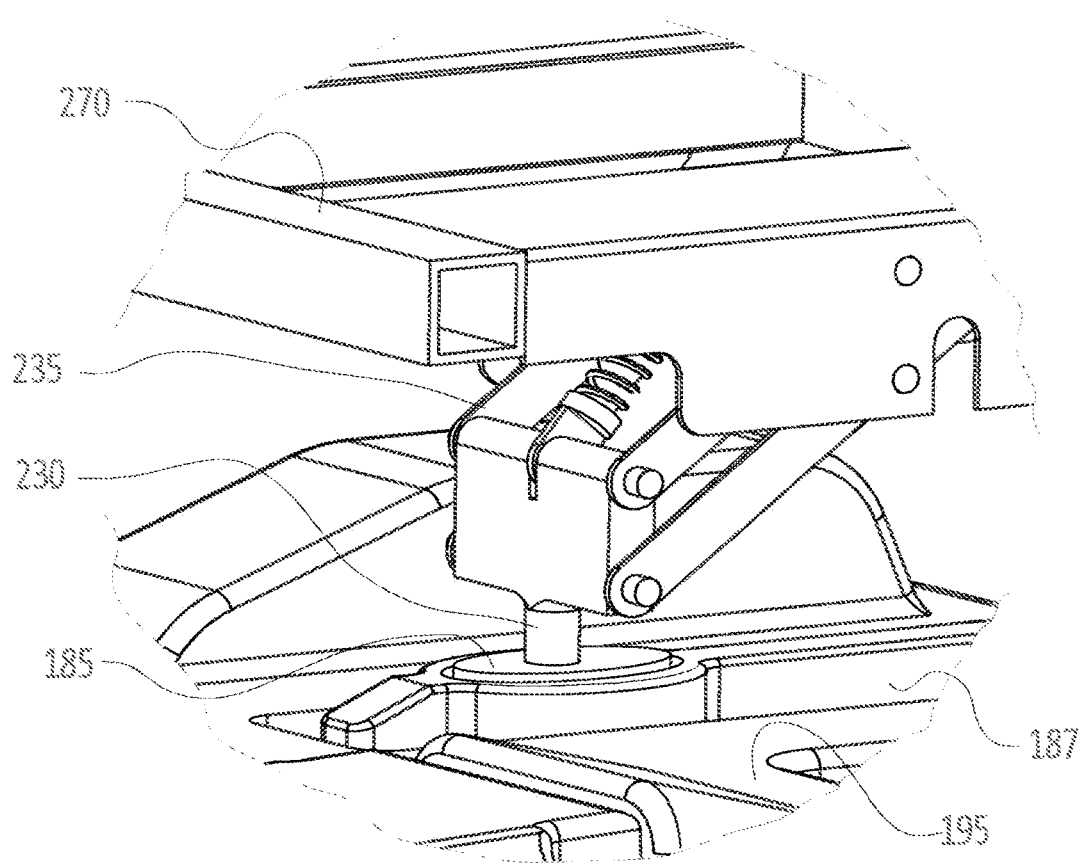
FIG. 7 shows a schematic example a service station according to one embodiment of the teachings of this application.

In one embodiment the charging station is a service station for refueling a robotic work tool operating using a combustion engine (or a combustion engine in combination with an electric motor). The charging or service station may then be arranged with one mating service connector 230 which is arranged to mate with a fuel intake. The mating service connector 230 may be biased using a pantograph structure such as in FIG. 5 or a lever structure such as in FIG. 4 to enter a fuel intake 185 as the fuel intake 185 is positioned under the mating service connector 230. FIG. 7 shows a schematic example of such a service station 210. Such a service station may benefit from may of the advantages listed and discussed above for a service station being a charging station. For example, the position of the mating connector 230 enables for a drive through arrangement. The fuel inlet 185 may be protected by an extending structure. The fuel inlet may also be arranged with a guiding surface for guiding the mating connector 230 into the fuel inlet 185. The mating connector 230 may be spring biased to automatically be inserted into the fuel inlet 185 upon mating. The mating connector may be arranged as a (flexible) pipe for protruding into the fuel inlet 185 upon mating.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

One benefit of the teachings herein is that the charging station is arranged to manage large charging currents. Another advantage is that the drive-through design reduces the tracks and lawn-wear in the area surrounding the charging station 210. Another benefit is that the charging station is enabled to allow for variations in height due to different robotic work tool models, wear, and dirt. The shape of the sliding contact brings about the benefit that the contact between the robotic work tool and the charging station is guided. And another benefit is that the arrangement reduces the need for cabling between different parts of the robotic work tool making assembly, disassembly and reassembly easier.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A robotic lawnmower system comprising:
a robotic lawnmower comprising a first charging connector and a second charging connector; and
a charging station comprising a first mating charging connector and a second mating charging connector,
wherein the first mating charging connector is configured to contact the first charging connector and the second mating charging connector is configured to contact the second charging connector in response to the robotic lawnmower entering into the charging station order to charge the robotic lawnmower and the first mating charging connector and the second mating charging connector are configured to be movable in response to the contact with the first charging connector or the second charging connector, with a component of movement of the first mating charging connector and the second mating charging connector being in a direction parallel to a movement direction of the robotic lawnmower entering into the charging station, wherein the first mating charging connector and the second mating charging connector are arranged in series relative to the movement direction of the robotic lawnmower entering into the charging station.

2. The robotic lawnmower system of claim 1, wherein the first charging connector and the second charging connector are arranged in series relative to the movement direction of the robotic lawnmower entering into the charging station.

3. The robotic lawnmower system of claim 1, wherein the first mating charging connector and the second mating charging connector are spring-biased to enable contact with the first and the second charging connector.

4. The robotic lawnmower system of claim 1, wherein the first mating charging connector and the second mating charging connector are configured to allow the robotic lawnmower to enter into the charging station from a first end of the charging station and exit the charging station from a second end of the charging station, the first end and the second end being different.

5. The robotic lawnmower system of claim 1, wherein the charging station is configured to supply a charging current exceeding 2 amps.

6. The robotic lawnmower system of claim 1, wherein the first charging connector and the second charging connector are arranged on a side of the robotic lawnmower.

7. A robotic lawnmower system comprising:
a robotic lawnmower comprising a first charging connector and a second charging connector; and
a charging station comprising a first mating charging connector and a second mating charging connector,
wherein the first mating charging connector is configured to contact the first charging connector and the second mating charging connector is configured to contact the second charging connector in response to the robotic lawnmower entering into the charging station to charge the robotic lawnmower and the first mating charging connector and the second mating charging connector are configured to be movable in response to the contact with the first charging connector or the second charging connector, with a component of movement of the first mating charging connector and the second mating charging connector being in a direction parallel to a movement direction of the robotic lawnmower entering into the charging station,
wherein the first mating charging connector and the second mating charging connector are arranged in series relative to the movement direction of the robotic lawnmower entering into the charging station,
wherein the first mating charging connector and the second mating charging connector are further configured to move with a component of movement being perpendicular to the movement direction of the robotic lawnmower entering into the charging station in response to contact with the first and the second charging connector.

8. A charging station for a robotic lawnmower, the charging station comprising:
a first mating charging connector; and
a second mating charging connector,
wherein the first mating charging connector is configured to contact a first charging connector of the robotic lawnmower and the second mating charging connector is configured to contact a second charging connector of the robotic lawnmower in response to the robotic lawnmower entering into the charging station to charge the robotic lawnmower and the first mating charging connector and the second mating charging connector are configured to be movable in response to the contact with the first charging connector or the second charging connector, with a component of movement of the first mating charging connector and the second mating charging connector being in a direction parallel to a movement direction of the robotic lawnmower entering into the charging station,
wherein the first mating charging connector and the second mating charging connector are arranged in series relative to a movement direction of the robotic lawnmower entering into the charging station.

9. The charging station of claim 8, wherein the first mating charging connector and the second mating charging connector are spring-biased to enable contact with the first and the second charging connector.

10. The charging station of claim 8, wherein the first mating charging connector and the second mating charging connector are further configured to move with a component of movement being perpendicular to the movement direction of the robotic lawnmower entering into the charging station in response to contact with the first and the second charging connector.

11. The charging station of claim 8, wherein the first mating charging connector and the second mating charging connector are configured to allow the robotic lawnmower to enter into the charging station from a first end of the charging station and exit the charging station from a second end of the charging station, the first end and the second end being different.

12. The charging station of claim 8, wherein the charging station is configured to supply a charging current exceeding 2 amps.

13. A robotic lawnmower system comprising:
a robotic lawnmower comprising a first charging connector and a second charging connector; and
a charging station comprising a first mating charging connector and a second mating charging connector,
wherein the first mating charging connector is configured to contact the first charging connector and the second mating charging connector is configured to contact the second charging connector in response to the robotic lawnmower entering into the charging station to charge the robotic lawnmower and the first mating charging connector and the second mating charging connector are configured to be movable in response to the contact with the first charging connector or the second charging connector, with a component of movement of the first mating charging connector and the second mating charging connector being in a direction parallel to a movement direction of the robotic lawnmower entering into the charging station,
wherein the first mating charging connector and the second mating charging connector are arranged in series relative to the movement direction of the robotic lawnmower entering into the charging station,
wherein the first mating charging connector and the second mating charging connector are spring-biased with a directional component of the spring-bias being in a direction parallel to the movement of the robotic lawnmower.

\* \* \* \* \*